(12) United States Patent
Hume

(10) Patent No.: US 8,356,443 B1
(45) Date of Patent: Jan. 22, 2013

(54) COVERABLE FISH NET APPARATUS

(76) Inventor: Daniel R. Hume, Ingersoll (CA)

(*) Notice: Subject to any disclaimer, the term of this patent is extended or adjusted under 35 U.S.C. 154(b) by 229 days.

(21) Appl. No.: 12/983,662

(22) Filed: Jan. 3, 2011

(51) Int. Cl.
*A01K 77/00* (2006.01)

(52) U.S. Cl. ............................................. 43/11

(58) Field of Classification Search .............. 43/10–12; D22/135; 119/161; 294/1.3–1.5; 15/257.6; 135/33.2
See application file for complete search history.

(56) References Cited

U.S. PATENT DOCUMENTS

| | | | |
|---|---|---|---|
| 609,160 A * | 8/1898 | Mowithey | 99/323.5 |
| 4,139,961 A * | 2/1979 | Markos | 43/12 |
| 4,262,948 A * | 4/1981 | Emme | 294/1.5 |
| 5,276,995 A | 1/1994 | Johnson | |
| 5,822,908 A * | 10/1998 | Blanchard | 43/11 |
| 7,644,532 B2 * | 1/2010 | Capio | 43/11 |
| 2010/0013251 A1 * | 1/2010 | Yang | 294/1.3 |
| 2010/0132242 A1 | 6/2010 | Emter, Jr. | |

* cited by examiner

*Primary Examiner* — Kimberly Berona

(57) ABSTRACT

The coverable fish net apparatus provides for easily netting a fish and selectively covering the first frame and large net with the second frame with small net. The second frame with small net is slideably positioned in a plurality of positions along the handle, with the second frame being capable of positioning on the handle well above the first frame and progressively positioned closer to the first frame. The second frame may further be positioned partially over the first frame, and completely over the first frame, thereby trapping a fish within. Release of the lever positions the second frame with small net as chosen. Effectively netting a plurality of sizes of fish is thereby best accomplished, with less chance of fish escape. The apparatus further provides for easily reviving a fish prior to release.

4 Claims, 6 Drawing Sheets

COVERABLE FISH NET APPARATUS

BACKGROUND OF THE INVENTION

The oft encountered difficulties in netting and retaining a fish within a net are well understand. The present apparatus provides unique solutions to this problem as well as providing a means for fish revival.

FIELD OF THE INVENTION

The coverable fish net apparatus relates to fish nets and more especially to a fish net with slideably positioned and lockable small net above the lower large net.

SUMMARY OF THE INVENTION

The general purpose of the coverable fish net apparatus, described subsequently in greater detail, is to provide a coverable fish net apparatus which has many novel features that result in an improved coverable fish net apparatus which is not anticipated, rendered obvious, suggested, or even implied by prior art, either alone or in combination thereof.

To attain this, the coverable fish net apparatus provides for easily netting a fish and selectively covering the first frame and large net with the second frame with small net. The second frame with small net is slideably positioned in a plurality of positions along the handle, with the second frame being capable of positioning on the handle well above the first frame and progressively positioned closer to the first frame. The second frame may further be positioned partially over the first frame, and completely over the first frame, thereby trapping a fish within. Release of the lever positions the second frame with small net as chosen. Effectively netting a plurality of sizes of fish is thereby best accomplished, with less chance of fish escape.

Of importance is that the first and second frames may be provided in identical egg shapes. In positioning the handle vertically in water, the nets and frames are then best positioned, with large egg portion downwardly, to enable the revival of fish, prior to release for example. The shape thereby effectively avoids fish fin entanglement.

Importantly, the frames and the handle may be provided in rigid materials to aid in slideable sleeve operation and in full proof function. The frames and handle may further be provided in rectangular stock of metal, alloys, composites, plastics, and other appropriate materials in order to further enhance strength and integrity.

Thus has been broadly outlined the more important features of the improved coverable fish net apparatus so that the detailed description thereof that follows may be better understood and in order that the present contribution to the art may be better appreciated.

An object of the coverable fish net apparatus is to assure capturing a fish within a net.

Another object of the coverable fish net apparatus is to selectively position a small net and frame over a large net and frame, thereby creating a fish trap.

A further object of the coverable fish net apparatus is to selectively and rigidly position a small net and frame over a large net and frame.

An added object of the coverable fish net apparatus is to ensure travel of the small net and frame over the large net and frame in severe use conditions.

And, an object of the coverable fish net apparatus is to provide an ideal fish net for fish revival.

These together with additional objects, features and advantages of the improved coverable fish net apparatus will be readily apparent to those of ordinary skill in the art upon reading the following detailed description of presently preferred, but nonetheless illustrative, embodiments of the improved coverable fish net apparatus when taken in conjunction with the accompanying drawings.

DETAILED DESCRIPTION OF THE DRAWINGS

With reference now to the drawings, and in particular FIGS. 1 through 6 thereof, the principles and concepts of the coverable fish net apparatus generally designated by the reference number 10 will be described.

Figure 1:
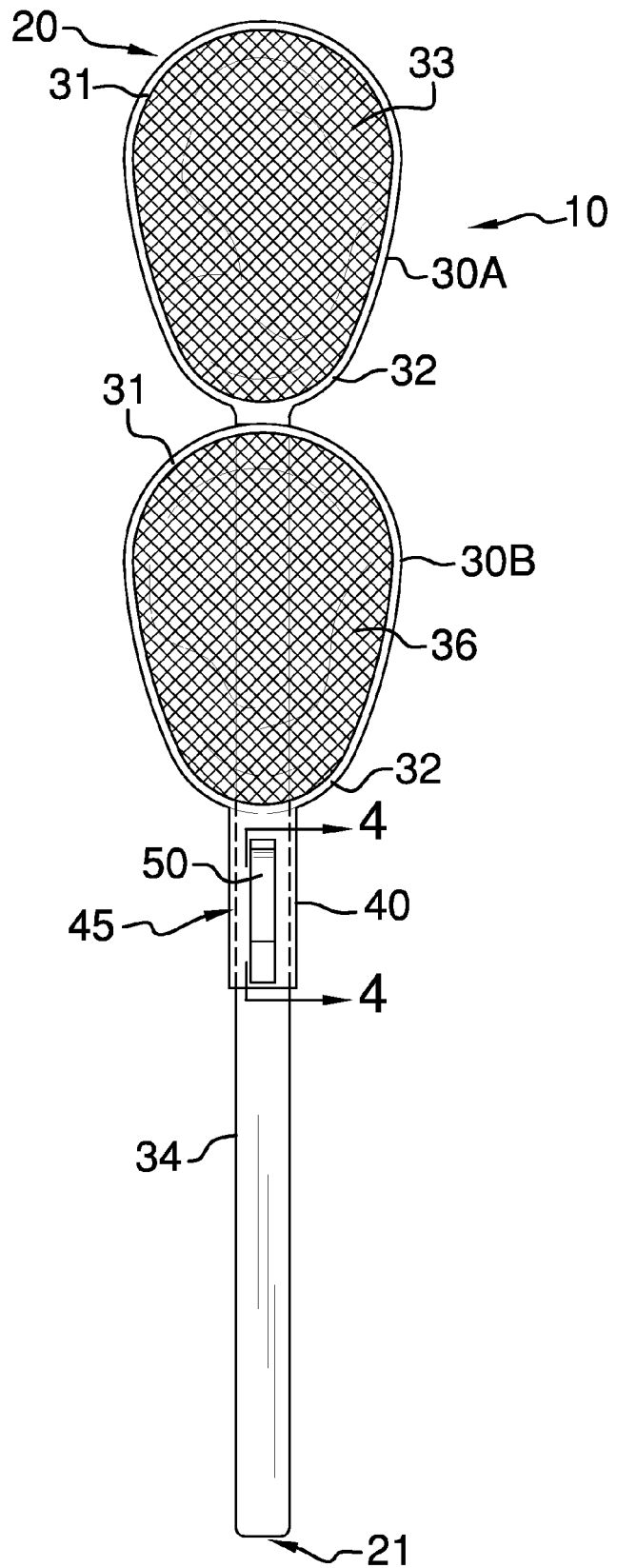
FIG. 1 is a top plan view.

Referring to FIG. 1, the apparatus 10 partially comprises the first end 20 spaced apart from the second end 21. The planar egg shaped first frame 30A is disposed at the first end 20. The large portion 31 of the first frame 30A is disposed distally. The small portion 32 is disposed medially.

Figure 2:
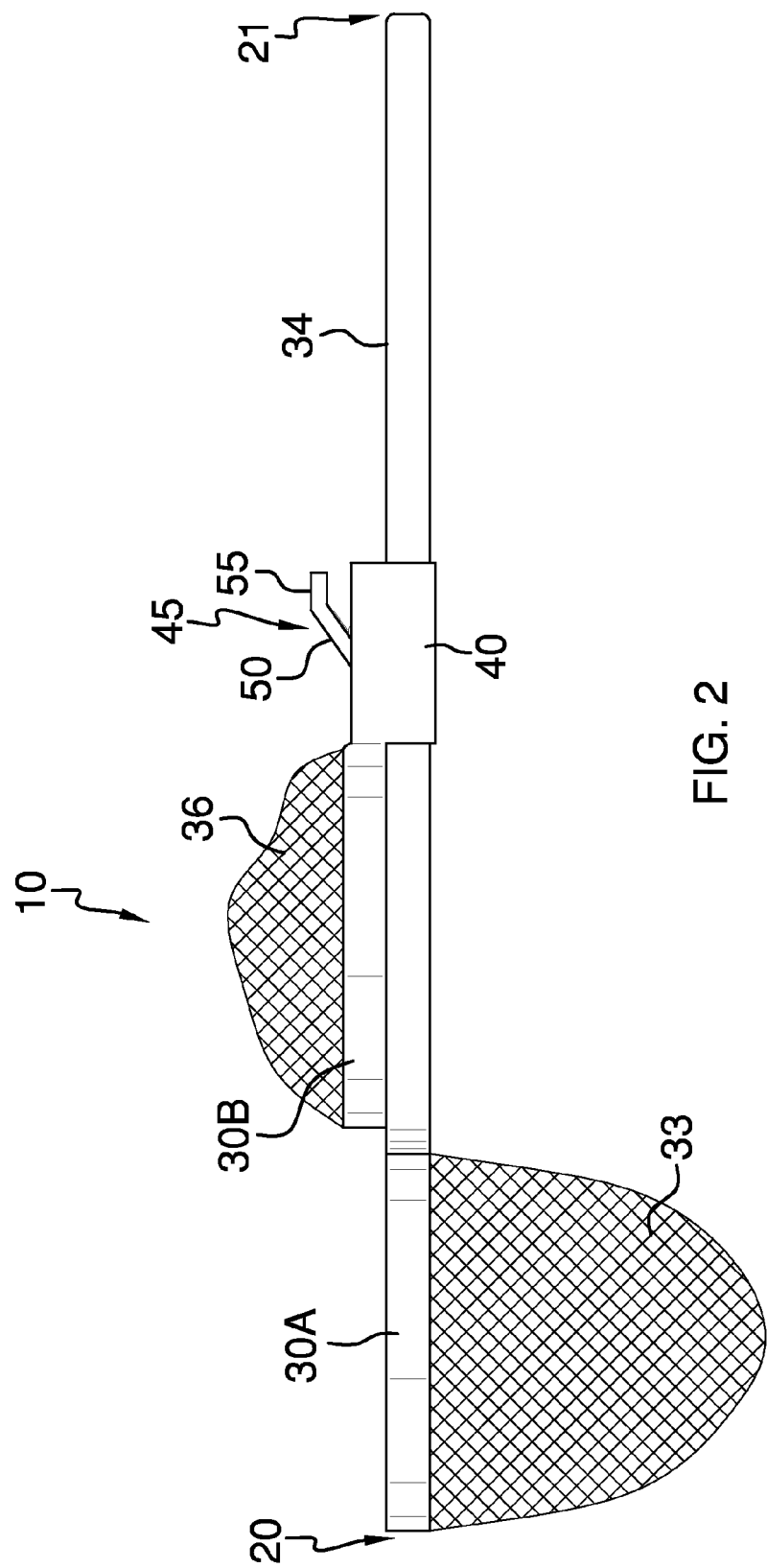
FIG. 2 is a lateral elevation view with small net positioned away from the large net.

Referring to FIG. 2, the large net 33 is flexibly suspended downwardly from the first frame 30A. The handle 34 is inflexibly extended from the first frame 30A small portion 32 to the second end 21.

Figure 4:
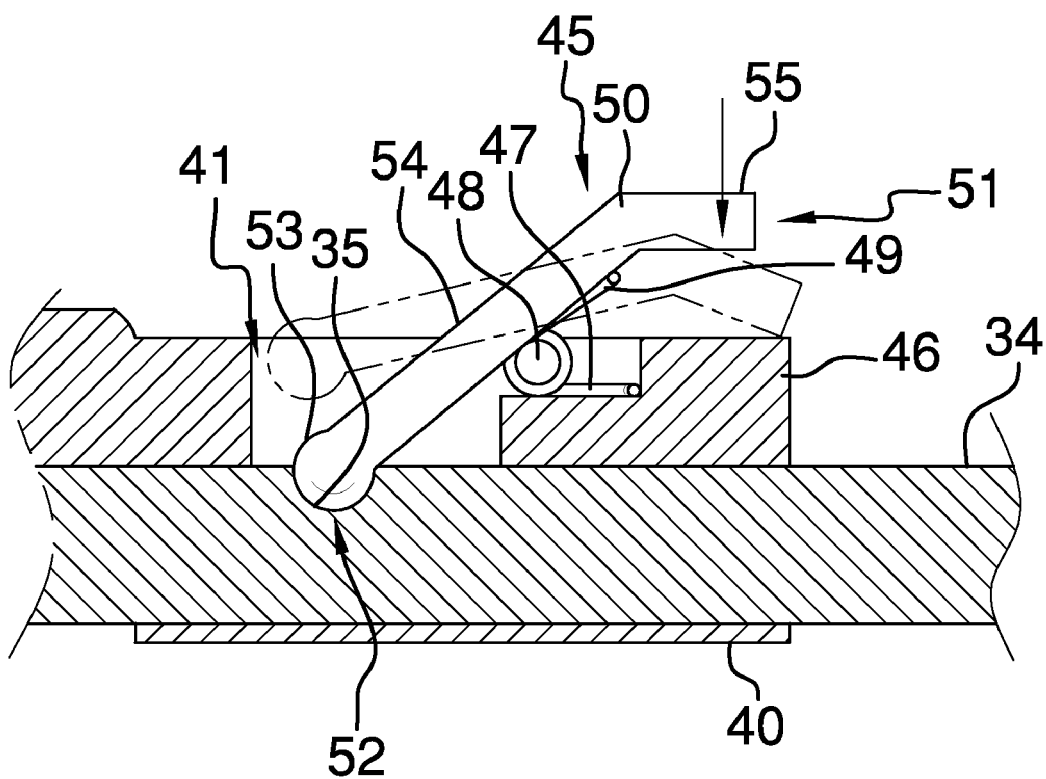
FIG. 4 is a partial cross sectional view of FIG. 1, taken along the line 4-4.
Figure 5:
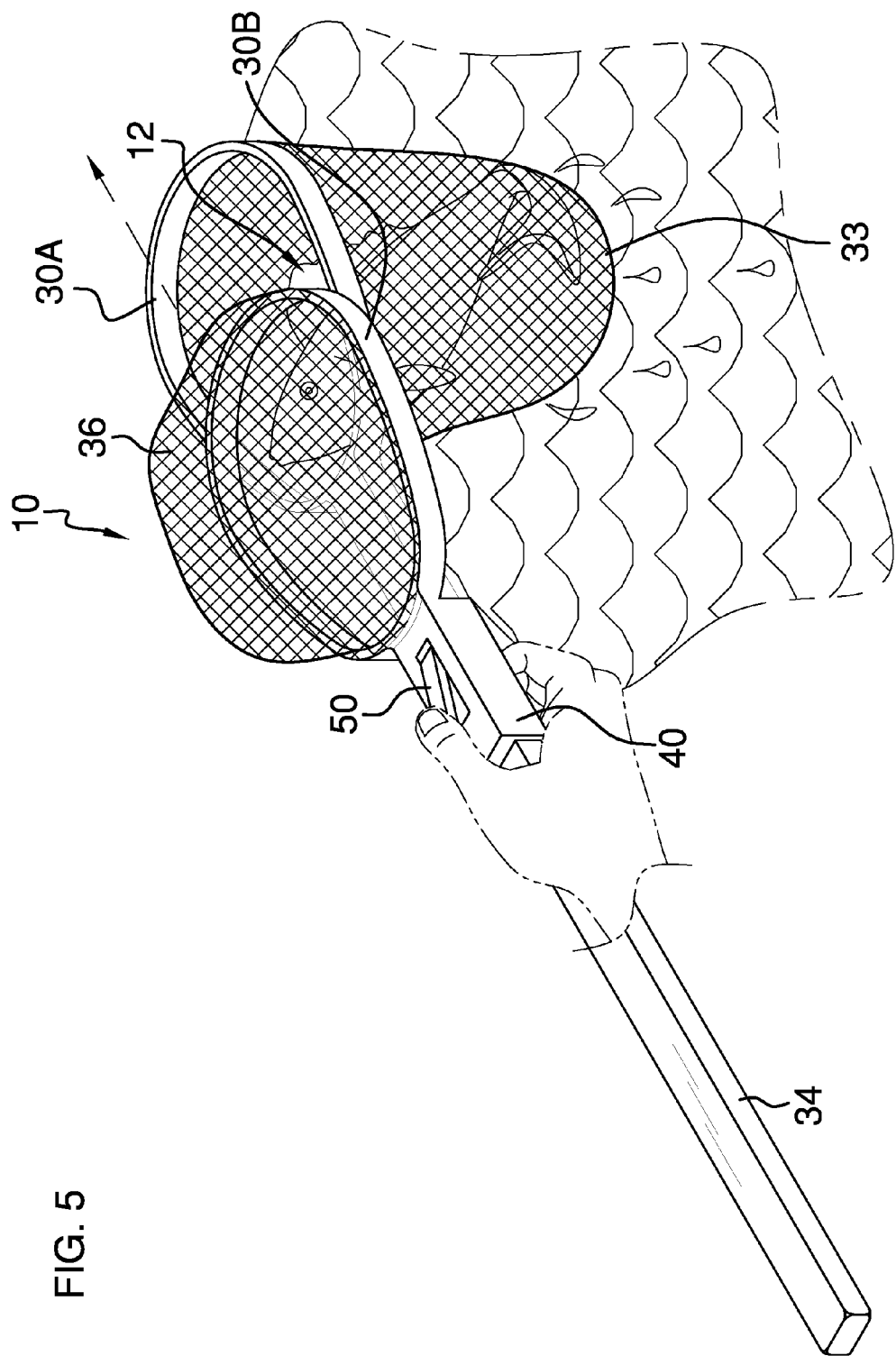
FIG. 5 is a perspective view of the apparatus used in catching a fish, with small net and frame positioned partially above the large net and frame.

Referring to FIG. 4, a plurality of spaced apart semicircular detents 35 is disposed upwardly along the handle 34.

Figure 3:
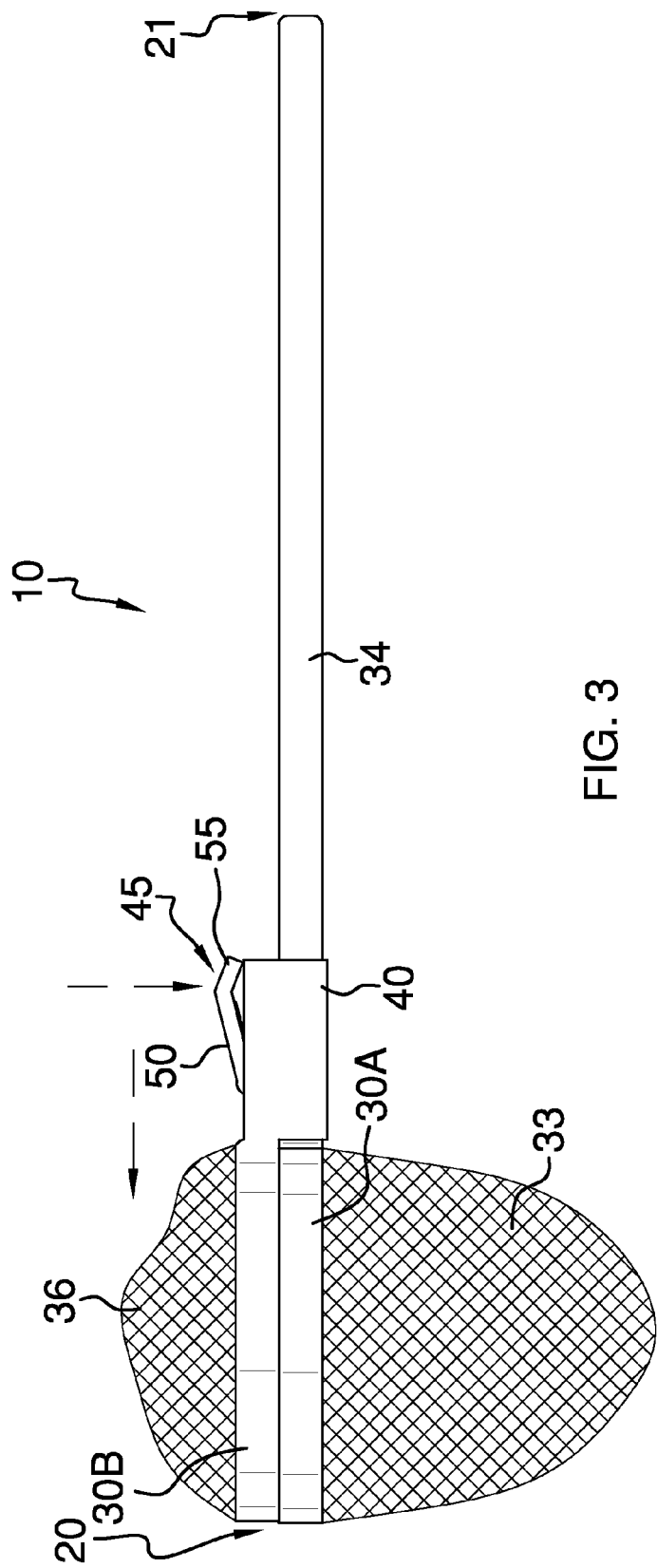
FIG. 3 is a lateral elevation view, small net with frame positioned atop the large net with frame.

Referring again to FIG. 2 and also to FIG. 3, the sleeve 40 is slideably disposed around the handle 34.

Referring again to FIG. 4, the opening 41 is disposed upwardly and medially within the sleeve. The lock mechanism 45 is disposed upwardly within the sleeve 40 opening 41. The lock mechanism 45 partially comprises a stair step 46. The lower step 47 is disposed medially within the stair step 46. The pivot 48 is disposed atop the lower step 47. The lever 50 is disposed within the opening 41. The lever 50 has an upper end 51 spaced apart from a lower end 52. The ball 53 is disposed on the lever 50 lower end 52. The angled step 55 is disposed on the lever 50 upper end 51. The shaft 54 connects the ball 53 to the angled step 55. The shaft 54 is connected to the pivot 48. The spring 49 is in contact with the lower step 47 and the shaft 54. The spring 49 pressures the ball 53 downwardly. The ball 53 selectively engages with any one of the handle 34 semicircular detents 35.

Referring to FIG. 5 and again to FIGS. 1 and 4, the ball 53 selectively engages with any one of the handle 34 semicircular detents 35 to position the sleeve 40 and therefore the attached second frame 30B in any of a plurality of locations along the handle 34.

Referring to FIG. 3 and again to FIG. 1, the second frame 30B is identical to the first frame 30A. The second frame 30B small portion 32 is extended from the sleeve 40 toward the first end 20. The small net 36 is flexibly extended above the second frame 30B.

Referring again to FIG. 5, the sleeve 40 and therefore second frame 40B and small net 36 are positioned partially over the first frame 30A to reduce the size of the open area between the frames and nets.

Figure 6:
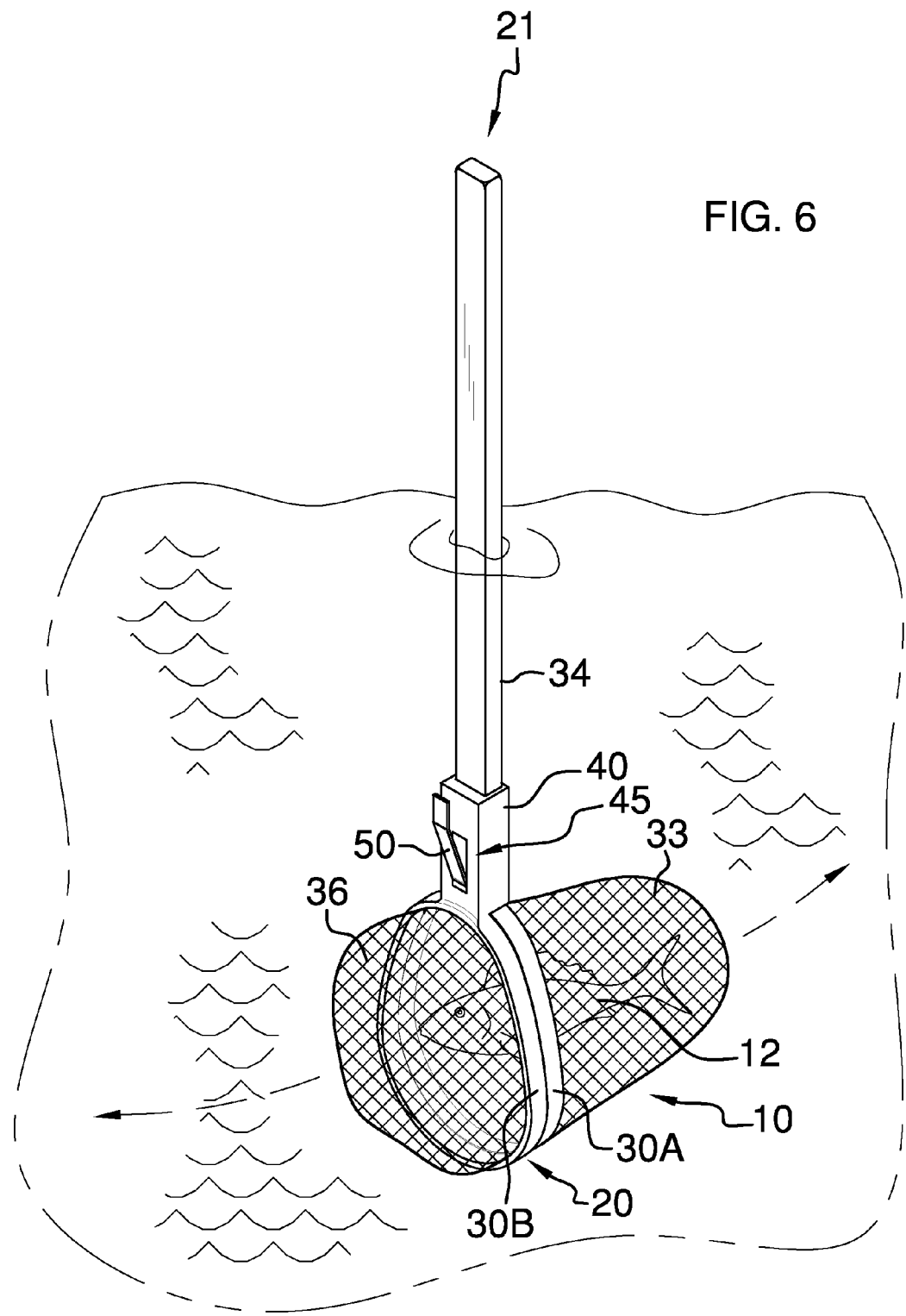
FIG. 6 is a perspective view of the apparatus in use reviving a fish entrapped therein.

Referring to FIG. 6, the handle 34 is selectively positioned vertically upright in the water. The small net 36 and large net 33 thereby form a horizontally disposed trap to hold the fish 12 within. In this manner the fish 12 can be properly revived and ensured of survival prior to release, for example. Importantly, a user can then depress the lever 50 angled step 55 and elevate the sleeve 40 and therefore the second frame 30B and small net 36 to release the fish 12 without having to touch the fish 12.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the coverable fish net apparatus may be used.

What is claimed is:

1. A coverable fish net apparatus comprising, in combination:
    a first end spaced apart from a second end;
    a planar egg shaped first frame disposed at the first end, a large portion of the first frame disposed distally, a small portion disposed medially;
    a large net flexibly suspended downwardly from the first frame;
    a handle inflexibly extended from the first frame small portion to the second end;
    a plurality of spaced apart semicircular detents disposed upwardly along the handle;
    a sleeve slideably disposed around the handle;
    an opening disposed upwardly and medially within the sleeve;
    a lock mechanism disposed upwardly within the sleeve opening, the lock mechanism comprising:
        a stair step;
        a lower step disposed medially within the stair step;
        a pivot disposed atop the lower step;
        a lever disposed within the opening, the lever having an upper end spaced apart from a lower end;
        a ball disposed on the lever lower end;
        an angled step disposed on the lever upper end;
        a shaft connecting the ball to the angled step, the shaft connected to the pivot;
        a spring in contact with the lower step and the shaft, whereby the ball is pressured downwardly by the spring, the ball selectively engaged with any one of the handle semicircular detents;
    a second frame identical to the first frame, the second frame small portion extended from the sleeve;
    a small net flexibly extended above the second frame;
    whereby the lock mechanism selectively engages the handle in positioning the second frame and small net selectively along the handle.

2. The apparatus according to claim 1 wherein the first frame, the second frame, and the handle further comprise rectangular stock.

3. A coverable fish net apparatus comprising, in combination:
    a first end spaced apart from a second end;
    a rigid planar egg shaped first frame disposed at the first end, a large portion of the first frame disposed distally, a small portion disposed medially;
    a large net flexibly suspended downwardly from the first frame;
    a rigid handle inflexibly extended from the first frame small portion to the second end;
    a plurality of semicircular detents disposed upwardly along the handle;
    a sleeve slideably disposed around the handle;
    an opening disposed upwardly and medially within the sleeve;
    a lock mechanism disposed upwardly within the sleeve opening, the lock mechanism comprising:
        a stair step;
        a lower step disposed medially within the stair step;
        a pivot disposed atop the lower step;
        a lever disposed within the opening, the lever having an upper end spaced apart from a lower end;
        a ball disposed on the lever lower end;
        an angled step disposed on the lever upper end;
        a shaft connecting the ball to the angled step, the shaft connected to the pivot;
        a spring in contact with the lower step and the shaft, whereby the ball is pressured downwardly by the spring, the ball selectively engaged with any one of the handle semicircular detents;
    a second frame identical to the first frame, the second frame small portion extended from the sleeve toward the first end;
    a small net flexibly extended above the second frame;
    whereby the lock mechanism selectively engages the handle in positioning the second frame and small net selectively along the handle.

4. The apparatus according to claim 3 wherein the first frame, the second frame, and the handle further comprise rectangular stock.

* * * * *